United States Patent [19]

Winter et al.

[11] Patent Number: 4,900,966
[45] Date of Patent: Feb. 13, 1990

[54] PROTECTION SWITCH FOR VEHICLE DC WINDOW MOTOR

[75] Inventors: Udo Winter, Kuernach; Andreas Schebler, Wuerzburg, both of Fed. Rep. of Germany

[73] Assignee: Siemens Aktiengesellschaft, Berlin & Munich, Fed. Rep. of Germany

[21] Appl. No.: 242,795

[22] Filed: Sep. 9, 1988

[30] Foreign Application Priority Data

Sep. 11, 1987 [DE] Fed. Rep. of Germany ....... 3730630

[51] Int. Cl.$^4$ ......................... H02K 11/00; H02P 5/16
[52] U.S. Cl. ................................... 310/239; 310/68 B; 310/68 C; 336/182; 340/648; 361/31
[58] Field of Search ..................... 310/68 B, 68 C, 83, 310/239, 244; 336/182, 183; 340/643, 648; 361/1, 31, 111, 113

[56] References Cited

U.S. PATENT DOCUMENTS

| | | | |
|---|---|---|---|
| 2,692,372 | 10/1954 | Goldstine | 336/183 |
| 4,275,342 | 6/1981 | Kawada et al. | 340/648 |
| 4,381,468 | 4/1983 | Adam et al. | 310/239 |
| 4,727,274 | 2/1988 | Adam et al. | 310/239 |

FOREIGN PATENT DOCUMENTS

| | | |
|---|---|---|
| 2813956 | 4/1979 | Fed. Rep. of Germany . |
| 2814009 | 10/1979 | Fed. Rep. of Germany . |
| 3151307 | 7/1983 | Fed. Rep. of Germany . |
| 2018044 | 10/1979 | United Kingdom . |

Primary Examiner—Patrick R. Salce
Assistant Examiner—D. L. Rebsch
Attorney, Agent, or Firm—Kenyon & Kenyon

[57] ABSTRACT

A dc commutator motor can be switched off when the motor rotor is short-circuited by the rotor's coming to a halt, by an operating switch (10). The switch is provided in the line connecting the brushes to a radio suppression network in a compact and simple design. The switch is operated by an ac voltage induced when the motor is running, with a frequency corresponding to the motor speed. A sensing winding connected to the operating switch for inducing the operating ac voltage is wound preferably around a radio interference suppression choke of the radio suppression network.

3 Claims, 2 Drawing Sheets

PROTECTION SWITCH FOR VEHICLE DC WINDOW MOTOR

BACKGROUND OF THE INVENTION a. Field of Invention

This invention pertains to an electric-motor drive arrangement for operating windows, sliding roofs and the like, particularly in motor vehicles, and more particularly to a commutator motor with a switch sensitive to short-circuit currents, said switch being integrally made with the commutator brushes.

An electric motor drive arrangement is disclosed in German Pat. No. 31 51 307. In this known arrangement, an operating switch is held in the closed position by the ac voltage induced when the motor is running. The induced ac voltage is sensed by a separate conductor coil which is arranged in the external connecting line in series with the commutator motor. The induced ac voltage is decoupled from the ground dc voltage by a capacitor, and is then amplified and rectified, and used for holding the operating switch in the closed position.

b. Objectives and Summary of the Invention

It is an objective of the present invention to reduce the amount of structure and the production time, as well as the overall size of a commutator motor used for operating devices such as windows, sliding roofs and the like in motor vehicles.

A further objective is to provide a motor which is turned off relatively rapidly under short circuit conditions, for instance, when the driven device reaches an end position.

Through the structure according to the invention, the expense for a separate inductance and its installation and its electrical connection can be dispensed with since it is incorporated or mounted on the radio interference suppression chokes already provided. Such chokes, for instance as described in German Pat. No. 28 14 009 or DE-AS No. 28 13 956 are used for radio interference suppression of the commutator motor in the brush holders are concurrrently used for determining the induced ac voltage.

In a particularly simple manner, the operating switch is coupled electrically to a radio interference suppression choke by a sensing winding wound around the radio interference suppression choke.

BRIEF DESCRIPTION OF THE DRAWINGS

The invention as well as further advantageous embodiments thereof will be explained in the following in greater detail, in conjunction with the drawings, wherein.

DETAILED DESCRIPTION OF THE INVENTION

Figure 1:
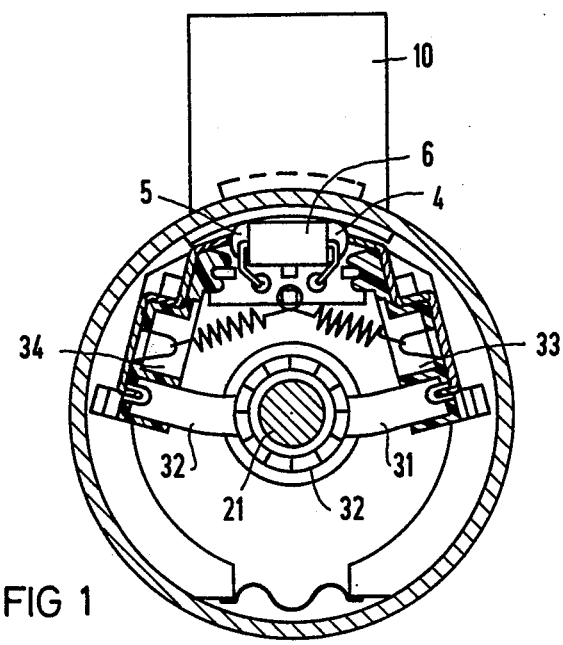
FIG. 1 shows a radial cross section through a dc commutator motor taken in the vicinity of the brush holders.
Figure 3:
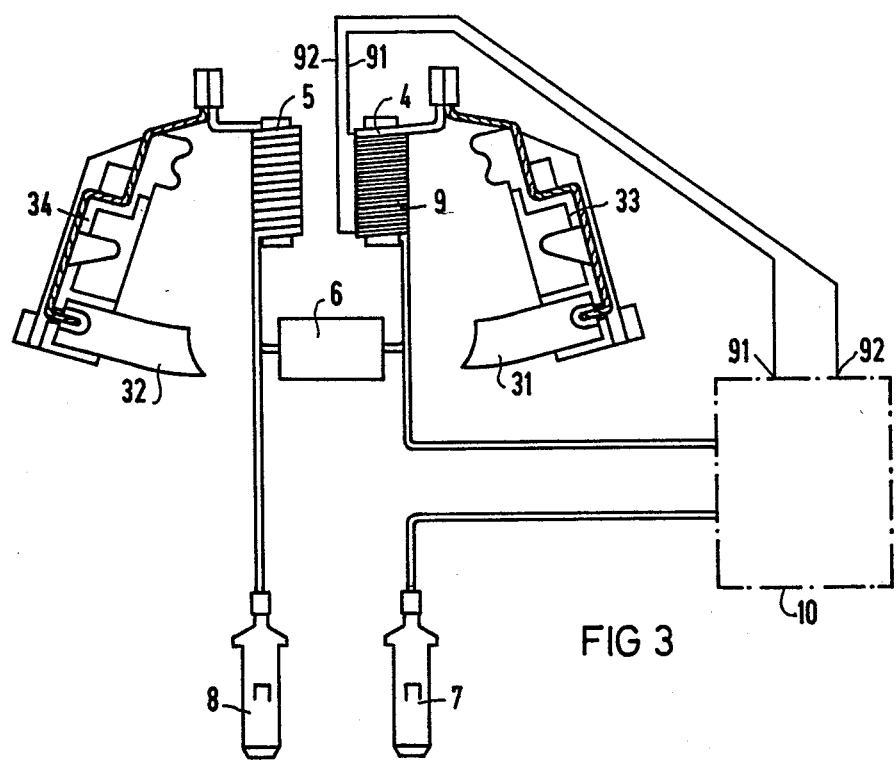
FIG. 3 shows the individual brush elements assembled by automated machinery before they are inserted into the brush holder of the motor of FIGS. 1 and 2.
Figure 2:
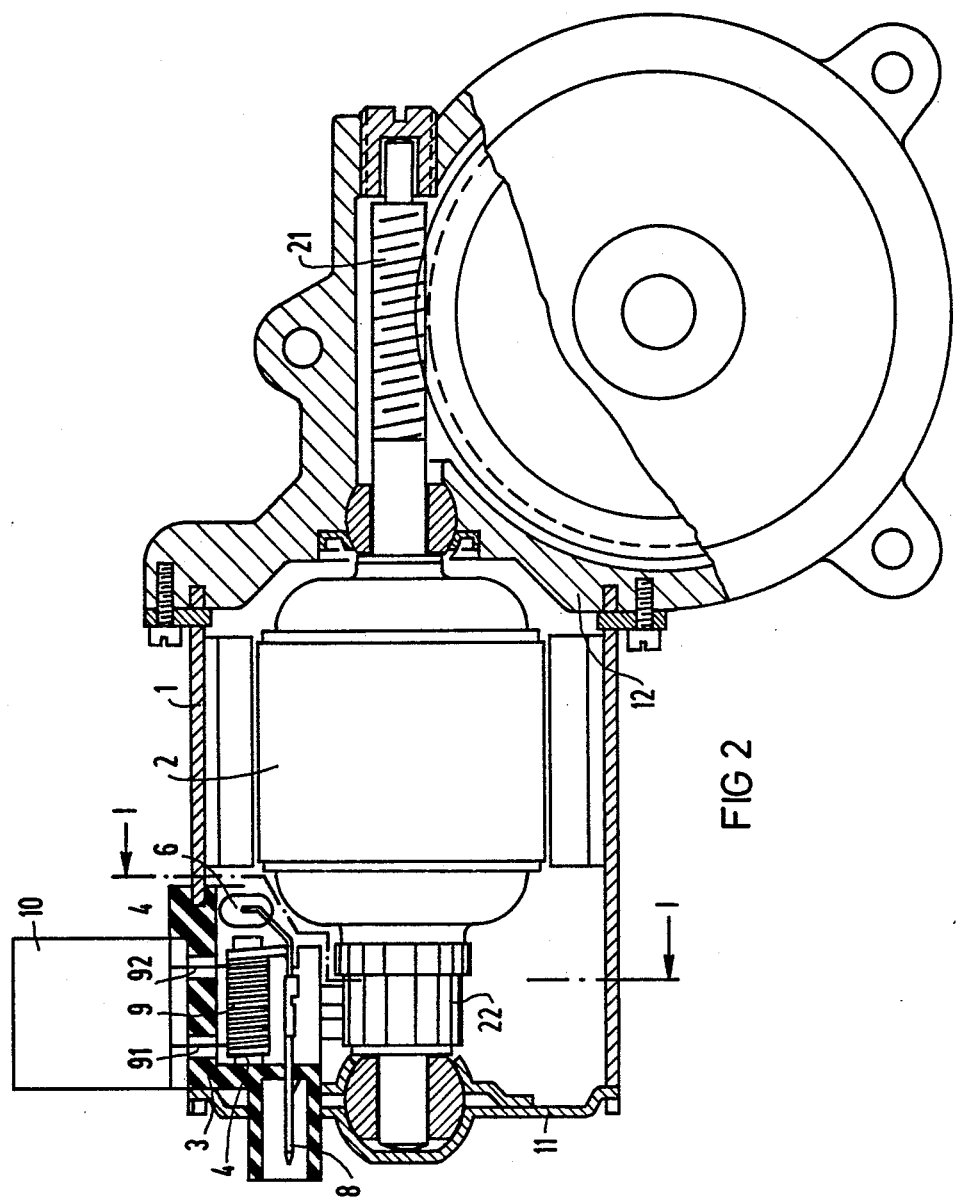
FIG. 2 shows an axial longitudinal cross section through the dc commutator motor of FIG. 1.

Referring now to the drawings FIGS. 1, 2 show a dc commutator motor coupled on a right axial end, for instance, in a manner not shown in detail here, to a transmission housing of a motor vehicle window-lifting device. The transmission may be used for example to raise and lower a window in a motor vehicle.

The motor has two end bells 11, 12 axially fastened to a stator housing 1. The rotor 2 is rotatably supported by a rotor shaft 21. The shaft protrudes from the end bell 12 and is provided with a worm gear disposed in the transmission housing for driving the transmission. On the left end of the rotor shaft 21, within the stator housing 1 there is a commutator 22. The commutator has segments which slidably contact two carbon brushes 31, 32. The brushes are suspended at an angle by hammer-type brush holder 33, 34 introduced axially into a slot opening of the stator housing 1.

A conventional operating switch 10, such as a threshold value switch is shown only schematically in FIGS. 1, 2, and can be preassembled, for instance, as part of the brush holder 3. For this purpose, a switch housing can be injection-molded in one piece with the brush holder. A threshold value switch operates to interrupt a mechanical or electronic switch in a power supply line when a measured parameter falls below a specified minimum value.

The brush holder 3 also contains an interference suppression unit which consists of radio interference suppression chokes 4 and 5 connected in series with the carbon brushes 31, 32, respectively, through lines 7, 8. A radio interference suppression capacitor 6 shunts the radio interference suppression chokes 4, 5. One external connecting line 7 is connected in series with the operating switch 10, and with the corresponding radio interference suppression choke 4, so that line 7 is interrupted by the switch before the choke 4, in the case of a short circuit. Such a short circuit may be caused, for instance, if the motor vehicle window, or motor vehicle sliding roof driven by the dc commutator motor, reaches one of its end positions, causing a high flow of current to the carbon brushes 31, 32 and thereby to the rotor winding. To this end, the operating switch 10 is connected via internal connecting lines 91, 92 to a sensor coil or winding 9 which is wound around the radio interference suppression choke 4. The winding 9 provides in this manner a particularly simple, dc isolated coupling of the operating switch 10 for determining the ac voltage induced when the commutator motor is running.

What is claimed is:

1. An electric-motor arrangement for operating windows, sliding roofs and the like, particularly in motor vehicles, comprising: a dc commutator motor, with at least one brush holder; an operating switch that switches said dc commutator motor in response to a change in an induced ac voltage; a radio interference suppression choke connected to said brush holder and including an inductor coil constructed and arranged concentrically wound around said radio interference suppression choke and generating said ac voltage when said motor is running, and a connecting line connected between said coil and said operating switch.

2. The electric motor drive arrangement according to claim 1 wherein the operating switch is arranged on said brush holder.

3. A method of controlling an operating switch of a dc commutator motor that has a brush holder and radio interference suppression choke coupled to the brush holder, comprising:
providing an inductor coil wound concentrically on the radio interference suppression choke, said inductor coil being coupled to said operating switch;
inducing a voltage in said inductor coil when said motor is running;
switching off said motor with said operating switch upon a reduction in said voltage in said inductor coil, whereby no separate inductors and capacitors are needed.

* * * * *